(12) United States Patent
Rittmann et al.

(10) Patent No.: US 7,186,340 B1
(45) Date of Patent: Mar. 6, 2007

(54) PERCHLORATE REDUCTION AND RELATED WATER TREATMENT METHODS

(75) Inventors: Bruce E. Rittmann, Evanston, IL (US); Robert Nerenberg, South Bend, IN (US)

(73) Assignee: Northwestern University, Evanston, IL (US)

( * ) Notice: Subject to any disclaimer, the term of this patent is extended or adjusted under 35 U.S.C. 154(b) by 0 days.

(21) Appl. No.: 10/930,051

(22) Filed: Aug. 30, 2004

Related U.S. Application Data

(63) Continuation-in-part of application No. 10/637,802, filed on Aug. 8, 2003, now abandoned.

(60) Provisional application No. 60/402,520, filed on Aug. 9, 2002.

(51) Int. Cl.
*C02F 3/00* (2006.01)

(52) U.S. Cl. .............. 210/604; 210/610; 210/620; 210/631; 210/757

(58) Field of Classification Search .......... 210/604, 210/610, 620, 631, 757
See application file for complete search history.

(56) References Cited

U.S. PATENT DOCUMENTS 6,214,607 B1 * 4/2001 Logan ............... 435/262.5
2003/0205523 A1 * 11/2003 Kroon et al. ............ 210/601

* cited by examiner

*Primary Examiner*—Chester T. Barry
(74) *Attorney, Agent, or Firm*—Reinhart Boerner Van Deuren, S.C.

(57) ABSTRACT

Removal of oxidized contaminants from water. Perchlorate and other oxidized contaminants are reduced and removed from water with a method using a primary electron acceptor.

42 Claims, 13 Drawing Sheets

PERCHLORATE REDUCTION AND RELATED WATER TREATMENT METHODS

This application claims priority benefit from and is a continuation-in-part of application Ser. No. 10/637,802 filed Aug. 8, 2003 now abandoned, the entirety of which is incorporated herein by reference, which in turn claims priority benefit from U.S. provisional application Ser. No. 06/402,520 filed Aug. 9, 2002, the entirety of which is also incorporated herein by reference.

BACKGROUND OF THE INVENTION

Removal of oxidized contaminants is an important component of a safe drinking water supply. Biological processes are rapidly gaining acceptance, both domestically and abroad. Treatment systems include biologically-active filters utilizing aerobic processes. However, anaerobic processes can also be used, but have not been commonly employed for purposes of drinking water treatment for reasons relating to the requirement of an electron donor. For instance, methanol, ethanol, and the acetate, which are common organic donors, can cause biological instability, induce taste and odor problems, and may create additional health concerns.

Accordingly, the search for alternate anaerobic water treatments has been an on-going concern in the art. For instance, nitrate, nitrite and other oxidized contaminants are disclosed as removed from drinking water using hydrogen-oxidizing bacteria; that is, biologically with hydrogen as an electron donor. See, U.S. Pat. No. 6,387,262, the entirety of which is incorporated herein by reference.

As described in the aforementioned '262 patent, as an electron donor, hydrogen gas is oxidized by the bacteria with release of electrons for reduction of the contaminant(s). For example, nitrate is reduced in a step wise fashion to innocuous nitrogen gas:

$NO_3^- + 2H^+ + 2e^- == NO_2^- + H_2O$ $NO_2^- + H^+ + e^- == NO + OH^-$ $NO + H^+ + e^- == 0.5N_2O + 0.5H_2O$ $0.5N_2O + H^+ + e^- == 0.5N_2 + 0.5H_2O$ $NO_3^- + 5H^+ + 5e^- == 0.5N_2 + 2H_2O + OH^-$ (overall)

Perchlorate ($ClO_4^-$) is an oxidized anion that can originate from a variety of ammonium, potassium, magnesium or sodium salts. Ammonium perchlorate, for example, is a primary ingredient of solid rocket fuel. The short shelf-life of rocket fuel has created an environmental concern given the large volume of perchlorate-containing wastes generated over the years by unused fuel. At least 20 states have confirmed perchlorate contamination, and more sites may be found, as perchlorate has been used or manufactured in up to 40 states. Perchlorate is understood to inhibit thyroid function and is suspect in various other health-related issues. The State of California, recognizing the problem, recently lowered its perchlorate drinking water action level from 18 to 4 μg/L. Even so, a recent toxicological and risk characterization study by the Environmental Protection Agency suggests 1 μg/L as a treatment goal for drinking water.

Perchlorate is not removed by conventional physical-chemical water treatment techniques, and other processes, such as ion exchange, electrodialysis and reverse osmosis are costly and result in a concentrated perchlorate waste stream that still requires disposal. As a result, perchlorate contamination of ground water continues to be an environmental issue.

Perchlorate can be reduced, however, to chloride by perchlorate-reducing bacteria, which use perchlorate as an electron acceptor for growth. Perchlorate-reducing bacteria are readily obtainable in the environment, have a wide range of metabolic capabilities, such as aerobic growth and denitrification, and do not require specialized growth conditions—all attributes suitable for a perchlorate treatment system.

Recent work has shown that bioreactors can reduce perchlorate to below 4 μg/L when the initial concentration is high or when the reactor has been previously operated at high perchlorate concentrations. However, low initial perchlorate concentrations, in the μg/L range, may preclude biomass growth on perchlorate as the sole acceptor electron growth, as predicted by the relationship:

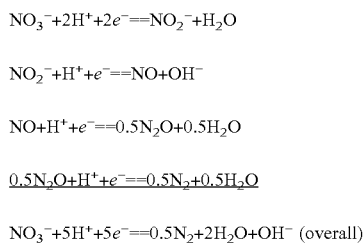

where S is the rate-limiting substrate concentration [MS/L3], $q_{max}$ is the maximum specific substrate utilization rate [MX/MS-T], K is the half-maximum-substrate-utilization constant [M/L3], X is the biomass concentration [MX/L3], Y is the biomass true yield [MX/MS], and b [1/T] is the endogenous decay rate. When S is small with respect to K, it can render the positive term on the right side of the equation smaller than the negative term, providing a net decay in biomass for any value of X. Under such conditions, biomass cannot be produced or sustained.

Even so, microbial treatments such as those described in the '262 patent leave several concerns as open issues. For instance, while nitrate/nitrite reduction is discussed, therein, and other oxidized contaminants are mentioned as likewise treatable, concurrent treatment of multiple contaminants remains unaddressed. The '262 patent does not disclose concurrent treatment, and work thereafter appears to indicate full nitrate removal is required for perchlorate reduction to useful levels. As a result, efforts continue in the art to address concurrent treatment of multiple oxidized contaminants, with corresponding movement progress toward a comprehensive treatment methodology.

SUMMARY OF THE INVENTION

Figure 1:
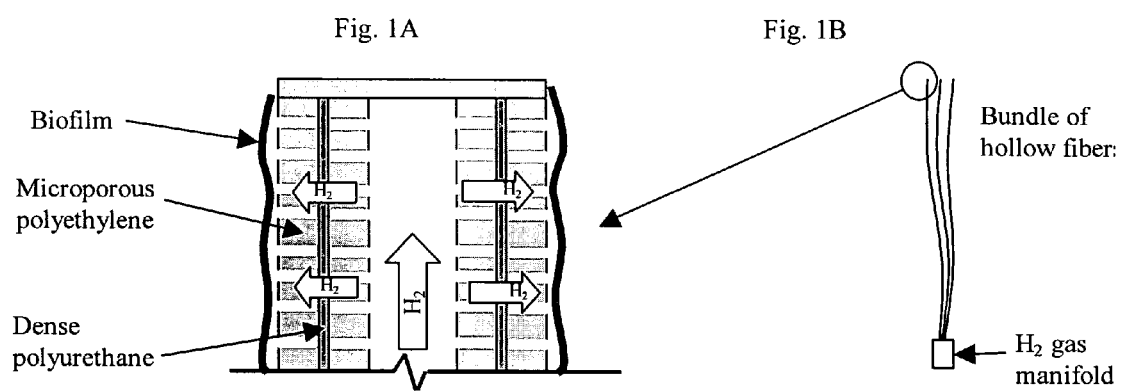
FIG. 1. (A) A schematic sectional view of a hollow fiber membrane; (B) a schematic view of a hollow fiber membrane bundle.

In light of the foregoing, it is an object of the present invention to provide one or more methodologies for treatment, reduction and/or removal of perchlorate and/or other oxidized contaminants, thereby overcoming various issues of the prior art, including those outlined above. It will be understood by those skilled in the art that one or more aspects of this invention can meet certain objectives, while one or more other aspects can meet certain other objectives. Each objective may not apply equally, in all its respects, to every aspect of this invention. As such, the following objects can be viewed in the alternative with respect to any one aspect of this invention.

As an object of the present invention to provide a method for removing an oxidized contaminant from an aqueous water stream through use of one or more primary electron acceptor components, regardless of the concentration of the oxidized contaminant, such a method especially useful at concentrations less than those otherwise thought to sustain steady-state biomass accumulation.

It can also be an object of the present invention to provide a method of water treatment for concurrent removal of an oxidized contaminant and removal of a primary electron acceptor component also present in the water stream.

It can also be an object of the present invention, alone or in conjunction with one of the preceding, to provide a method for selection of bacteria reducing an oxidized contaminant upon introduction of such contaminant to a treated water stream.

It can also be an object of the present invention to provide a method, useful with a range of apparatus configurations, alone or in conjunction with existing drinking water treatment systems for—among other oxidized contaminants—nitrate, perchlorate, chlorate and/or chlorite removal.

Other objects, features, benefits and advantages of the present invention will be apparent from this summary and its descriptions of various embodiments, and will be readily apparent to those skilled in the art having knowledge of various anaerobic, biological water treatment techniques. Such objects, features, benefits and advantages will be apparent from the above as taken in conjunction with the accompanying examples, data, figures and all reasonable inferences to be drawn therefrom, alone or with consideration of the references incorporated herein.

In part, the present invention provides a method for removing a perchlorate component from an aqueous system. Such a method comprises (1) providing an aqueous system comprising at least one hydrogen-oxidizing bacteria, a primary electron acceptor component and a perchlorate component; (2) contacting the system with gaseous hydrogen; and (3) reducing the perchlorate component. Hydrogen-oxidizing bacteria are known to those skilled in the art and would be understood by those made aware of this invention as including both hydrogen-oxidizing, autotrophic bacteria, as well as those bacteria also able to utilize organic carbon and other energy sources in addition to hydrogen. A primary electron acceptor is an oxidized component reduced in conjunction with the aforementioned oxidation, such reduction at least in part sufficient to sustain a viable, steady-state biomass within the aqueous system. Such component capable of providing such a function would be understood by those skilled in the art and made aware of this invention. Such reduction providing energy for growth can be referred to as a dissimilatory reduction, with perchlorate as a secondary acceptor in the context of this methodology. Without limitation, a primary electron acceptor component can be selected from oxygen and nitrate anion—either one of which preferably has a system concentration at least in part sufficient to support steady-state accumulation of bacteria—or a combination thereof.

Regardless of the chemical identity of such a component functioning as a primary electron acceptor, such a component can be introduced to such a system prior to introduction of the perchlorate component, such that a sustainable biomass can be achieved. Alternatively, such a component can be introduced concurrent with that of the perchlorate component to the system. Accordingly, with regard to the latter, the primary electron acceptor component (e.g., nitrate anion) can be influent to the system with a waste stream comprising the subject perchlorate component. As illustrated by several of the following examples, the present invention can be utilized with influent perchlorate concentrations greater than about 100 μg/L or below which would otherwise—in the absence of a primary acceptor—support biofilm accumulation. Regardless, effluent concentrations can be less than about 4 μg/L, meeting applicable state and/or federal guidelines.

In part, the present invention also provides a general method of using a primary electron acceptor to remove an oxidized contaminant from an aqueous system. Such a method comprises (1) providing an aqueous system comprising hydrogen-oxidizing, autotrophic bacteria; (2) introducing a primary electron acceptor component to such a system; (3) introducing an oxidized contaminant to the system; and (4) contacting the system with gaseous hydrogen. As mentioned above, hydrogen-oxidizing bacteria are known in the art, several species and/or strains of which are described herein. Oxygen, nitrate anion or a combination thereof can be used as a primary electron acceptor component, for optimal results at a concentration at least in part sufficient for supporting steady-state accumulation of bacteria.

Without limitation, as provided by one of several embodiments, the oxidized contaminant can be perchlorate, chlorate, chlorite or a combination of such contaminants. Other oxidized contaminants removed by the present methodology include those described herein. As demonstrated by several examples below, repetitious or continuous introduction of the oxidized contaminant can promote concurrent removal of the primary electron acceptor. Likewise, such introduction can enhance removal of the oxidized contaminant, such enhancement as can be expressed in terms of rate of or time for removal. Without limitation, as presented under conditions of surface or groundwater contamination, the primary electron acceptor component and the oxidized contaminant are influent to the system. Regardless, such a system can be used in conjunction with another water treatment process; that is, as an adjunct to another system for enhanced or complimentary removal of contaminants.

In part, the present invention can also provide a method of using a water treatment apparatus for selection of bacteria capable of reducing an oxidized contaminant. Such a method comprises (1) providing a system comprising hydrogen-oxidizing bacteria and an apparatus comprising at least one hollow fiber membrane, each of which is in fluid communication with a hydrogen source; (2) introducing a primary electron acceptor component to the system; (3) introducing an oxidized contaminant to the system; and (4) contacting the system with gaseous hydrogen, for oxidation by the bacteria, such that the system is selective for bacteria reducing the oxidized contaminant. In certain embodiments, the membrane can comprise inner and outer layers having a first density and a layer therebetween having a second density greater than the first density. In various preferred embodiments, while the former layers can be porous, the latter layer is substantially non-porous to reduce or avoid hydrogen sparging, or conditions deleterious to biomass accumulation.

As mentioned above and demonstrated in several of the following examples, the primary electron-acceptor component can be selected from oxygen and nitrate anion. Results associated with such a methodology can be improved or optimized with such a component at a concentration at least in part sufficient for supporting steady-state accumulation of bacteria. Regardless of primary acceptor identity or concentration, the oxidized contaminant can be independently selected from perchlorate, chlorate, chlorite or a combination thereof. Introduction of any such oxidized contaminant(s), upon contact with hydrogen, can be used to select for bacteria reducing the particular oxidized contaminant(s).

Figure 11:
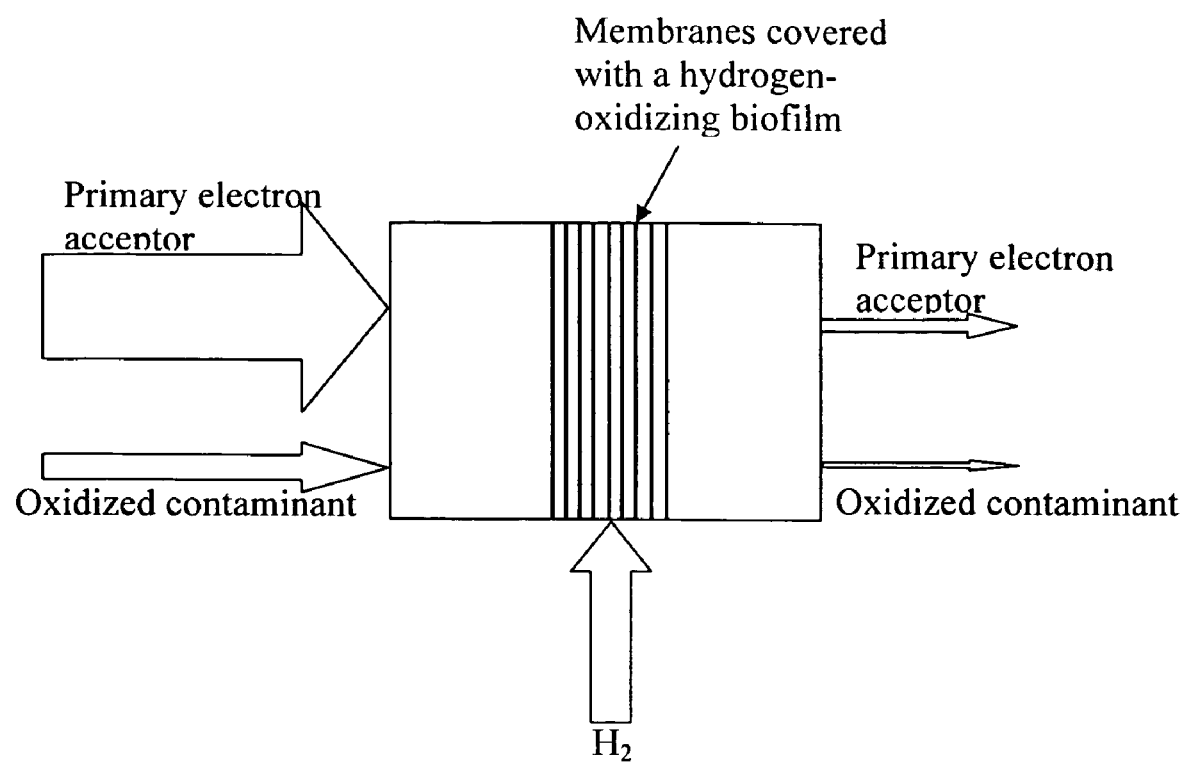
FIG. 11. A schematic representation illustrating removal of oxidized contaminants regardless of apparatus, fiber or membrane configuration, in accordance with this invention.

Schematically, the methodologies of this invention can be considered with reference to FIG. 11. Primary electron acceptor and oxidized contaminant components can, optionally, be introduced at various levels relative one to another, as indicated. Contact of a system comprising hydrogen-oxidizing bacteria provides corresponding reduction and removal of the components. Such a method can be employed without restriction to any one biofilm reactor apparatus, fiber or membrane configuration, consistent with the broader aspects and considerations of this invention.

Hydrogen is an ideal electron donor for bioreactors reducing oxidized anions, such as perchlorate, because (1) it is less expensive, per electron equivalent, than organic donors, such as acetate or methanol; (2) it is non-toxic, increasing public acceptance for its use for water treatment; (3) it is sparsely soluble, so it is not possible to "overdose" the system and cause re-growth; and (4) it can be generated on-site. The historic disadvantage is that hydrogen is difficult to deliver without sparging, a wasteful and potentially dangerous process. However, a hydrogen-based bioreactor, such as a hollow-fiber membrane biofilm reactor (MBfR) of the type described in the aforementioned, incorporated '262 patent, can deliver hydrogen safely and efficiently without sparging.

Without limitation, an MBfR useful in conjunction with the present methodology can comprise a bundle of hydrophobic hollow-fiber membranes collected into a hydrogen-supplying manifold at one end and sealed at the other. (A schematic, non-limiting construction and configuration is shown in FIGS. 1A–B.) Pressurized hydrogen is supplied to the interior of the fibers and diffuses through the wall to a biofilm growing on the fiber surface. The biofilm consumes hydrogen as it reduces oxidized contaminants present in the water. No hydrogen bubbles are produced, and the bulk liquid may have a negligible hydrogen concentration. An MBfR can be distinguished from "membrane bioreactors" used in prior art wastewater treatment: Membrane bioreactors use porous, hydrophilic membranes to separate particles from permeating water, while an MBfR can use microporous/non-porous membranes to deliver hydrogen gas to bacteria. The hollow fiber membranes illustrated in FIGS. 1A–B represent but one configuration useful in conjunction with the present invention. Various other membrane arrangements and configurations can be utilized, limited only by their ability to provide hydrogen gas to a system at a rate and concentration with consideration of the solubility of hydrogen in water and the risk of explosion. Generally, good results and economy are achieved with a membrane that can minimize or eliminate bubble formation. For instance, a hollow fiber membrane constructed of a dense, non-porous material—whether or not wholly or in part provided with one or more microporous components (e.g., adjacent to or therebetween)—can be used with good effect. Various other arrangements or configurations can be employed with the understanding that increased bubble formation increases risk of explosion, lowers system economy, and tends to disrupt biofilm formation.

Figure 2:
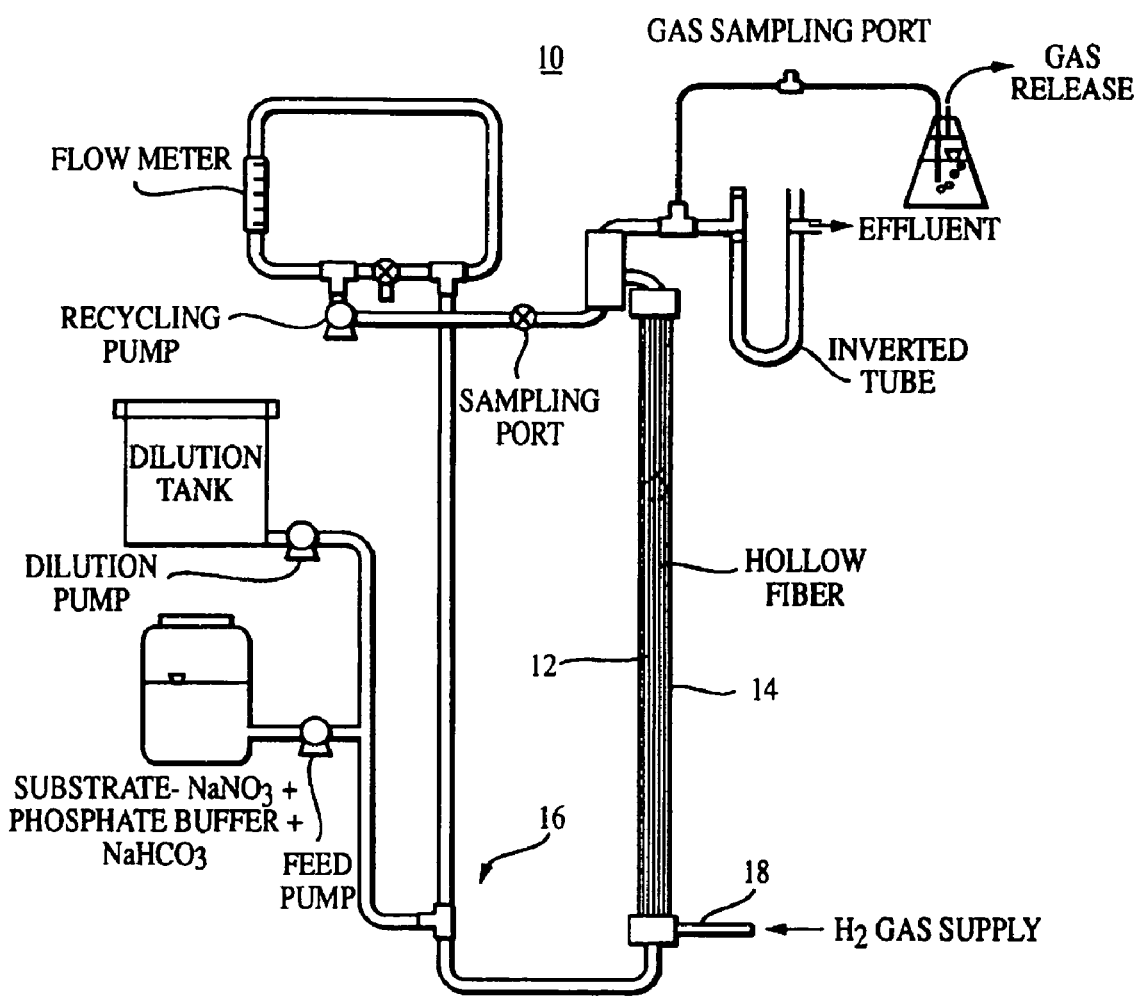
FIG. 2. A schematic of a membrane biofilm reactor, in accordance with apparatus of the type useful in conjunction with this invention.

While the methods of this invention of this invention are not limited to use with any one membrane, apparatus or configuration, one useful biofilm reactor 10 is shown in FIG. 2. The reactor 10 includes a hollow fiber bundle 12 housed in a tube 14. The tube 14 forms an enclosure that defines a volume to house the hollow fiber bundle. Water to be treated is supplied to the tube 14 from a pipe network, generally designated 16. A controllable hydrogen gas supply enters through an hydrogen inlet 18. The hollow fiber bundle 12 is formed from fibers having a substantially non-porous layer 20 sandwiched between two microporous layers 22. (Reference is made, more generally, to FIG. 1A.) The hydrogen gas is directed inside the fibers, which can be potted together at one end of the bundle 12. The opposite ends of the fibers are sealed, but free, allowing the fibers to move independently. The hydrogen gas is therefore contained under a controlled pressure within individual fibers. It dissolves and diffuses through the non-porous layer 22. Hydrogen emerges at the surface of the outer porous layer 20, where biofilm forms through metabolic interaction with the subject contaminant(s). This feature allows creation of a high driving force for gas dissolution without premature bubble formation. Physically and operationally, the fiber bundle arrangement has advantages over prior art methods and reactors, due to the manner in which biofilm forms in the reactor according to the invention. Other components in FIG. 2 can vary as any suitable system for water delivery to the enclosure 14 and removal of water and gas may be used. In one apparatus configuration, a dilution tank and contaminant substrate were used to control contaminant concentration and a recycle with feed pump controlled water flow in the system. Likewise, artisans will appreciate that hollow fiber arrangement and configuration can also vary to provide the hydrogen electron donor, and that other components of such a preferred embodiment may be altered to suit a particular application or process scale.

With further reference to FIG. 2, the hollow-fiber membrane bundle can, for example, be housed by a PVC tube, and with upward liquid flow. Hollow fibers of the sort useful in the apparatus of FIG. 2 are manufactured by Mitsubishi Rayon (Model MHF 200TL) and are available as a composite. The wall of the particular fiber was made up of two different materials. The outer and inner layers of the fiber wall were composed of microporous polyethylene. Between the two layers was a 1-µm thick layer of non-porous polyurethane. This non-porous layer allowed the creation of a high driving force for gas dissolution without premature bubble formation, the desirability of which is as previously mentioned. The hollow fibers were sealed on one end and open to the pressurized hydrogen supply on the other end. The outside or total diameter of one such fiber was 0.027 cm, and one 83-fiber bundle provided 750 cm² of surface area. As mentioned above, however, other fiber or membrane configurations can be used, with or without a column or tube configuration, without regard to scale or dimension.

When the liquid flow was turned on in the apparatus of FIG. 2, the hollow fibers expanded from the fixed end of the hollow-fiber bundle and moved independently. From approximately 10 cm above the potted end, the hollow fibers become evenly distributed throughout the cross-section of the liquid. The total volume of the prototype reactor was 420 ml (including the volume of the recirculation line). The void ratio of the working reactor volume (given the volume of a 1.5 cm diameter PVC tube is 191 cm³; volume of fiber was 5.1 cm³) was 97.3% when the hollow fibers were free of biofilm. This high ratio allowed biofilm to develop on the surface of the fiber without clogging the liquid flow path. It also decreased the frequency of fiber-to-fiber contact and, therefore, reduced the biofilm detachment and the opportunity for fibers to attach to each other due to biofilm growth.

In a conventional hydrogen-oxidizing system, a fixed-film or fluidized-bed biofilm reactor, in which all substrates (such as nitrate and hydrogen) are transferred from the liquid phase into the biofilm, is utilized. An apparatus such as that provided in FIG. 2 scheme offers an important advantage over convention. Since the biofilm is on the surface of the hollow fiber, the hydrogen flux goes directly into the biofilm. Nearly 100% utilization of hydrogen is attained, making the process more economically favorable and safer.

Preliminary studies were conducted on nitrate and perchlorate reduction by a hydrogen-oxidizing MBfR. The membrane fibers used therewith were installed in a tube reactor about 1 m long. The prototype contained 83 fibers that provided 750 cm² of surface area for biofilm attachment (specific surface area was 180 m$^{-1}$). Feed and recycling flow rates during the experiments were fixed at 10 and 1,750 ml/min, respectively. The recycle controlled the liquid flow velocity for good mass transport and to prevent fiber clumping. The system was seeded initially with *Ralstonia eutropha*, but a diverse mixed culture developed over time.

With reference to the results provided in the '262 patent, the influent nitrate concentrations were 10 and 12.5 mg N/l for the first and second steady states, respectively. At steady state with a liquid retention time of 40 min, there were achieved the desired partial removals of nitrate between 76 and 92% with effluent hydrogen concentration as low as 9 μgH$_2$/L. The nitrate flux was as high as 1 g N/m²-d due possibly to the "counter-diffusion" type of substrate transfer. Fiber clumping, and the biofilm detachment rate from the fibers were very low, about 0.015/day.

For each steady state, nonsteady-state experiments were run to test the MBfR's response to nitrate loading and hydrogen pressure. Each short-term study lasted for more than three liquid retention times to allow the formation of a pseudo-steady state in the reactor. The nonsteady-state experiments show that adjustments to the hydrogen pressure to the hollow fibers easily and rapidly controlled the effluent nitrate concentration and % nitrogen removal. For example, a loading of 0.1 mgN/cm²-d (=1 gN/m²-d) gave nearly 100% NO$_3^-$ removal when the hydrogen pressure to the fibers was 6.6 psi (0.45 atm), but reducing the hydrogen pressure to 3 psi (0.2 atm) gave partial removal of 50%. For drinking-water treatment, the goal is to keep the effluent NO$_3^-$—N below the standard of 10 mgN/L, which makes partial removal feasible and desirable. Other applications may require full nitrate removal and, therefore, higher hydrogen pressure.

Thereafter, the same laboratory-scale prototype reactor was used with addition of perchlorate. Immediate perchlorate removal (roughly 40% removal from 1,600 μg/L) was observed, and the removal increased over two weeks to nearly 100%, showing that some autotrophic denitrifiers were capable of reducing perchlorate, but that the growth of more bacteria with capability to remove perchlorate occurred over time. Perchlorate reduction to innocuous, chloride ion is believed to be achieved via an 8-electron pathway:

$$ClO_4^- + 2H^+ + 2e^- = ClO_3^- + H_2O$$

$$ClO_3^- + 2H^+ + 2e^- = ClO_2^- + H_2O$$

$$ClO_2^- = O_2 + Cl^-$$

$$\underline{O_2 + 4H^+ + 4e^- = 2H_2O}$$

$$ClO_4^- + 8H^+ + 8e^- = Cl^- + 4H_2O \text{ (overall)}$$

Perchlorate removal was somewhat affected by a high nitrate concentration in the reactor. NO$_3^-$—N greater than about 0.1 to 0.2 mg/L slowed perchlorate reduction, and NO$_3^-$—N above about 0.5 mg/L slowed perchlorate reduction by 50% or more. On the other hand, increasing the hydrogen pressure increased perchlorate removal, and the effect was much more dramatic than for denitrification.

After completing systematic studies with a laboratory prototype, it was used with perchlorate-contaminated groundwater: the groundwater with its normal ClO$_4^-$ concentration of 6 μg/L, and also with a ClO$_4^-$ concentration spiked to 100 or 50 μg/L. Removal of perchlorate below the 4 μg/L action level was observed in all cases. Stoichiometric computations based on the removals of all electron acceptors in the groundwater (i.e., 24 mg/L of NO$_3^-$—N, 6 mL of O$_2$, and 60 μg/L of ClO$_4^-$) show that hydrogen utilization is almost exactly equivalent to acceptor reduction—indicating that no hydrogen is wasted, a consideration for good economy and safe operation.

EXAMPLES OF THE INVENTION

The following non-limiting examples and data illustrate various aspects and features relating to the methods of this invention, including the treatment of perchlorate and related oxidized contaminants, as can be achieved through the techniques described herein. While the utility of this invention is illustrated through use of one or more articles, devices or apparatus that can be used therewith, it will be understood by those skilled in the art that comparable results are obtainable with various other articles/devices and apparatus, as are commensurate with the scope of this invention.

With regard to the present examples, perchlorate was analyzed by ion chromatography (IC) using a Dionex 4000i with conductivity detection. An AS-16 or AS-11 column was used followed EPA Method 314.0. All anions other than perchlorate (i.e., chloride, chlorate, chlorite, nitrate, among others) were analyzed on the same systems based on EPA Method 300.1 modified for a hydroxide-selective column. Dissolved hydrogen was analyzed with a reduction gas analyzer (Trace Analytical RGA3) using a headspace analysis described in the literature.

Example 1a

Figure 3:
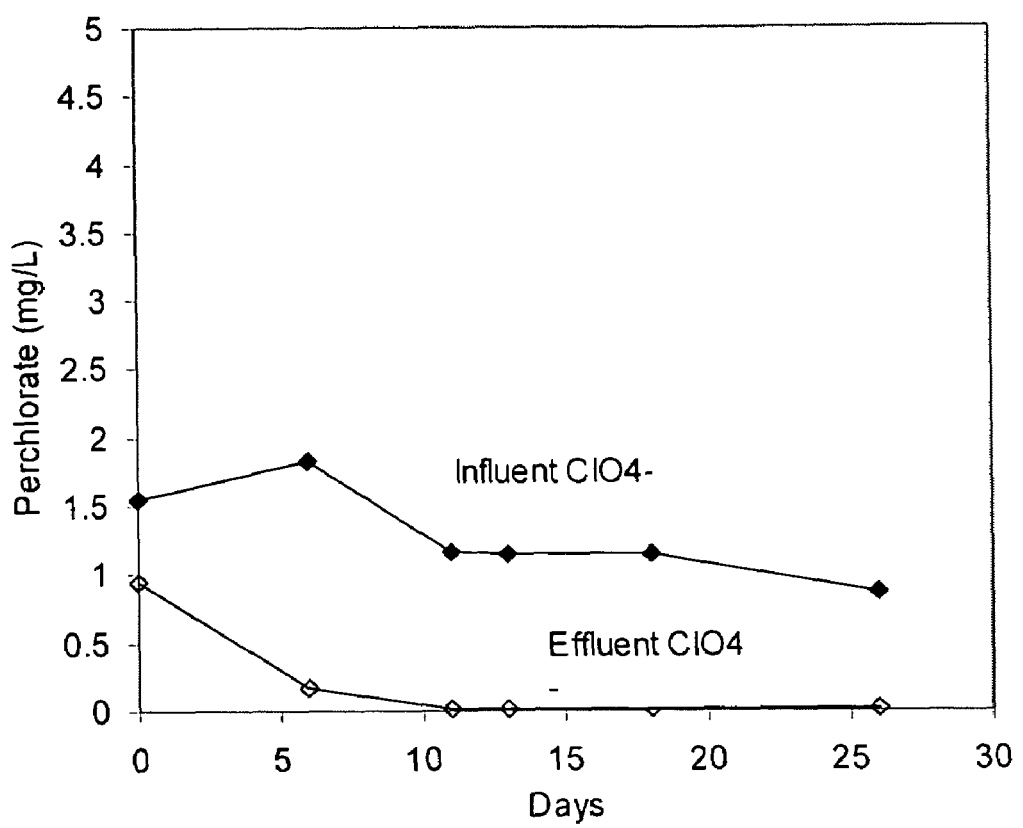
FIG. 3. Perchlorate reduction in an unacclimated, denitrifying MBfR.

Biological perchlorate reduction was studied in a denitrifying MBfR. The MBfR medium was based on tap water, and the reactor was seeded with bacteria from an MBfR used in a previous denitrification study. The seed included a mixed microbial population of autotrophic, denitrifying bacteria. After reaching steady-state with nitrate, and without having had any previous exposure to perchlorate, the MBfR influent was supplemented with 1,000 to 1,800 µg/L perchlorate. The reactor hydraulic detention time was 45 minutes, and it had a high recirculation rate to promote completely-mixed conditions. Initial nitrate removal was around 98% (data not shown), while initial perchlorate reduction was 60% (FIG. 3). Perchlorate reduction increased to 99% over 18 days, while the nitrate reduction rate remained approximately the same. The slow improvement in perchlorate reduction suggests an enrichment for specialized, perchlorate-reducing bacteria.

Example 1b

Figure 4:
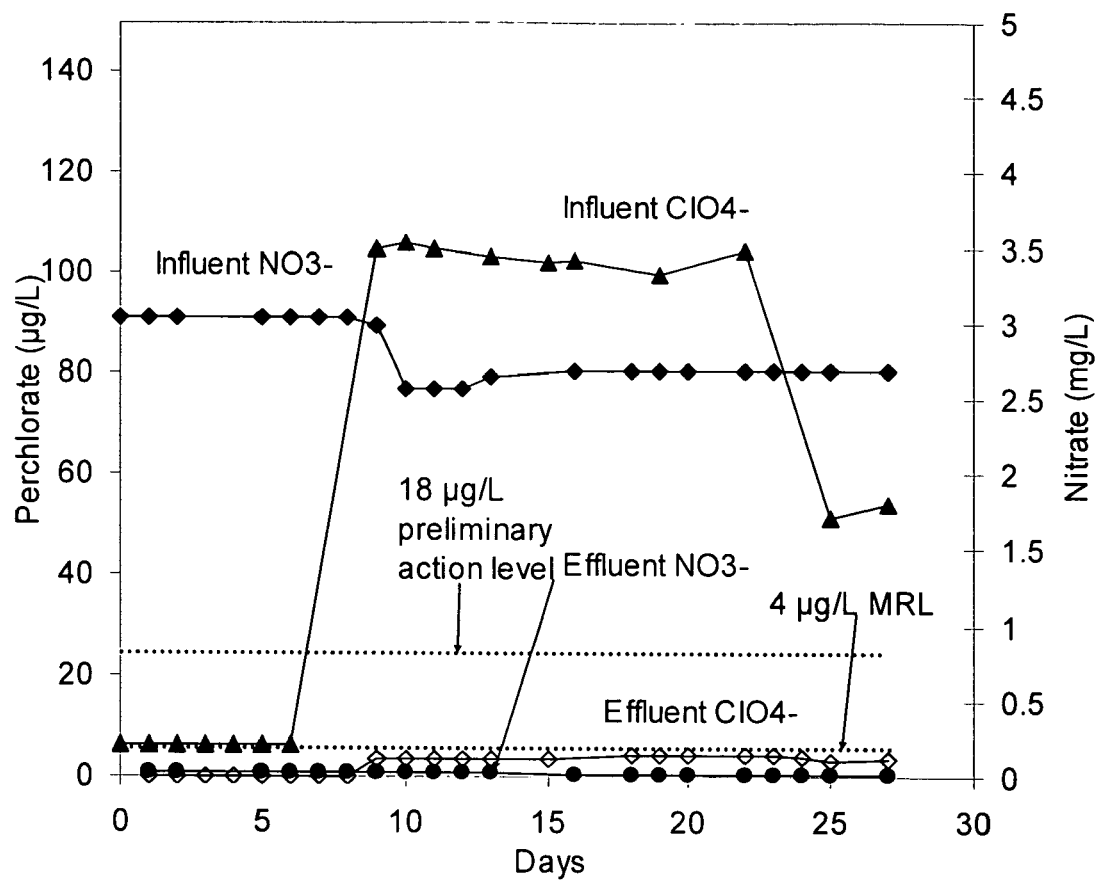
FIG. 4. Graphic results from groundwater tests.

The MBfR described above was tested with a perchlorate-contaminated groundwater collected from a well owned and operated by the Suburban Water Company, located in the Main San Gabriel Basin, California. No chemical additions, other than perchlorate and hydrogen, were made during the groundwater experiments. The influent nitrate concentration was 2.6 to 3.0 mgN/L. Three phases of testing were used over a period of 28 days. First, the groundwater was applied for 7 days with its natural perchlorate concentration of 6 µg/L, representing a low-perchlorate scenario. Second, the feed water was spiked with 100-µg/L perchlorate for 15 days, representing a high range of perchlorate in most contaminated groundwaters in Southern California. Finally, the reactor feed was spiked with 50 µg/L for 5 days, representing a mid-range of perchlorate contamination. The reactor operating conditions were similar to those described above. The influent and effluent perchlorate results are shown in FIG. 4. For all three phases of the test, the effluent perchlorate varied from non-detect (less than 2 µg/L) to 4.5 µg/L, and the effluent nitrate varied from 13 to 32 µgN/L, which corresponds to at least 99 percent removals of perchlorate and nitrate.

The groundwater experiments clearly demonstrate the feasibility of using the MBfR to remove perchlorate from groundwater that also contains nitrate. The reactor consistently achieved removals at or below the MRL of 4 µg/L over a four-week period. The reactor also responded well to sudden changes in perchlorate concentrations. For example, when the influent concentration was suddenly increased from 6 µg/L to 100 µg/L, the effluent perchlorate concentrations did not increase above 4 µg/L.

Example 1c

Figure 5:
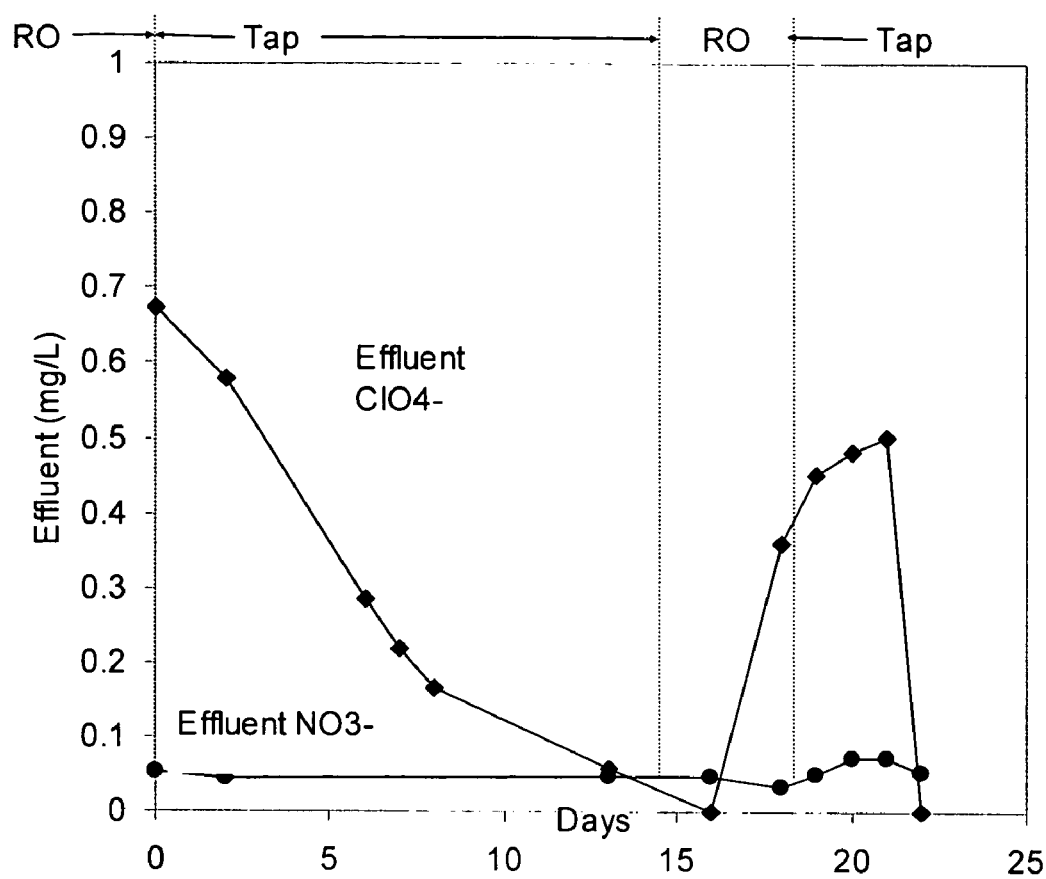
FIG. 5. Percholorate reduction with tap water and reverse-osmosis water.

The above MBfR was switched from tap water to a minimal medium prepared from reverse-osmosis-treated water. Both media contained 5 mgN/L nitrate and 1,000 µg/L perchlorate. Prior to starting the reverse-osmosis medium, the effluent perchlorate was non-detect. Immediately after starting the minimal medium, the effluent perchlorate concentration increased from non-detect to around 300 µg/L. The rate of nitrate reduction was not affected. Over several months, the perchlorate reduction rate further deteriorated, with effluent concentrations exceeding 900 µg/L. However, when the tap water medium was restored, the effluent perchlorate decreased to non-detect after 16 days (FIG. 5). This "acclimation" time period is similar to the 18 days it took to achieve maximum perchlorate removal when perchlorate was first introduced into the hydrogen reactor during the screening experiment. On the 16$^{th}$ day, RO-medium was reintroduced and effluent perchlorate increased to 360 µg/L by the next day, reaching 500 µg/L on day 21. At the end of day 21, tap-water medium was introduced a second time, and the next day perchlorate had returned to non-detectable levels. During all 21 days, the effluent nitrate concentration remained practically unchanged. This experiment shows that the minimal media lacked for perchlorate reduction, but not for denitrification. The slow disappearance of perchlorate reduction suggests the loss of specialized perchlorate-reducing bacteria. The subsequent increase of perchlorate reduction in the presence of tap water medium suggests a renewed enrichment of perchlorate-reducing bacteria.

Example 2a

*Dechloromonas* sp. PC1 is an autotrophic, hydrogen-oxidizing, perchlorate-reducing and denitrifying bacterium isolated from the reactor described in Example 1. Batch tests were carried out to determine the kinetic parameters $q_{max}$, Y, and K for PC1 (GenBank accession number AY126452). The kinetic parameters were determined for autotrophic growth using hydrogen as an electron donor. The Y and $q_{max}$ were determined using batch experiments with high initial acceptor and low initial biomass concentrations. The K was determined using batch non-growth tests with low initial biomass and acceptor concentrations. The experiments used 1-L bottles filled with 200 mL of media or 160-mL serum bottles filled with 25 mL of media, capped with butyl rubber stoppers, vacuum degassed, and filled with a gas mixture of 95% hydrogen and 5% $CO_2$ (for $q_{max}$, and Y) or with pure hydrogen (for K). The bottles were shaken on their side at 200 rpm. The experiments were carried out at least in triplicate. The growth medium contained, per liter: 1.386 g $Na_2HPO_4$, 0.849 g $KH_2PO_4$, 0.1 g $(NH_4)_2SO_4$, 0.2 g $MgSO_4.7H_2O$, 1 mg $CaCl_2.2H_2O$, and 1 mg $FeSO_4.7H_2O$. The trace mineral solution is described in the literature. The K experiments were carried out in a 12-mM phosphate buffer at pH of 7 with no nutrients or trace minerals. The pH was adjusted using 1 M NaOH for a final pH of 7.0. Curve fitting was used to estimate kinetic parameters $q_{max}$ and K for PC1 using a finite-differences solution of the substrate-utilization and biomass-growth equations:

$$\frac{dS}{dt} = \frac{q_{max}S}{S+K}X, \text{ and } \frac{dX}{dt} = \frac{Yq_{max}S}{S+K}X - bX.$$

Such relationships neglect competitive inhibition from chlorate during perchlorate reduction, providing a $q_{max}$ for perchlorate is an "apparent" value, valid only for the perchlorate range for which it was determined.

Example 2b

Figure 6A:
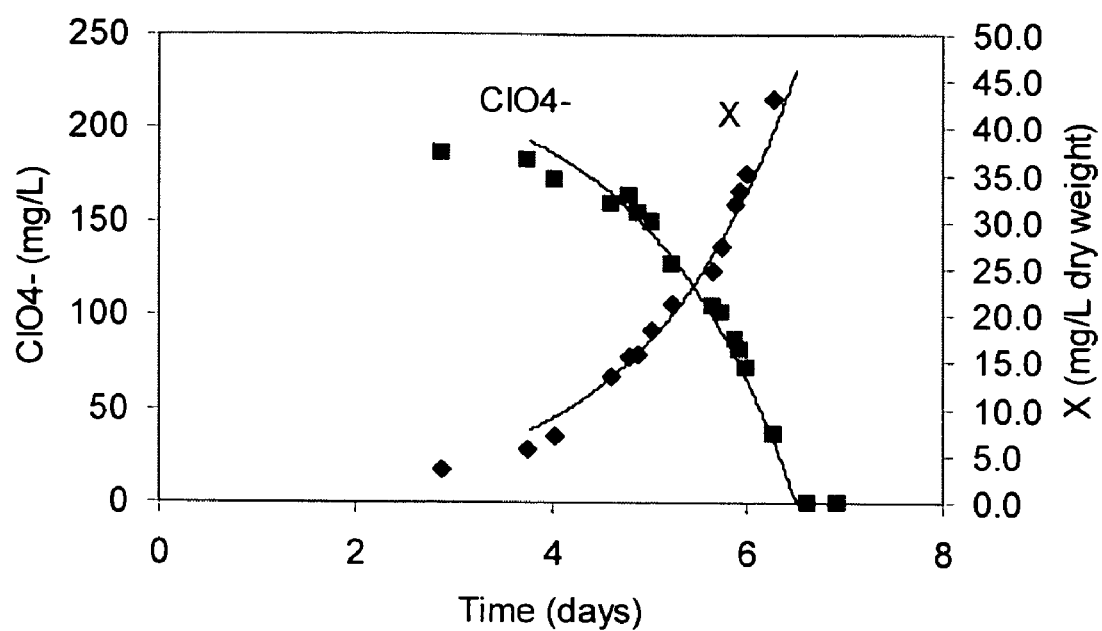
FIG. 6. Perchlorate kinetics tests for estimating (A) q and Y, (B) K (▲ data;— fit).
Figure 6B:
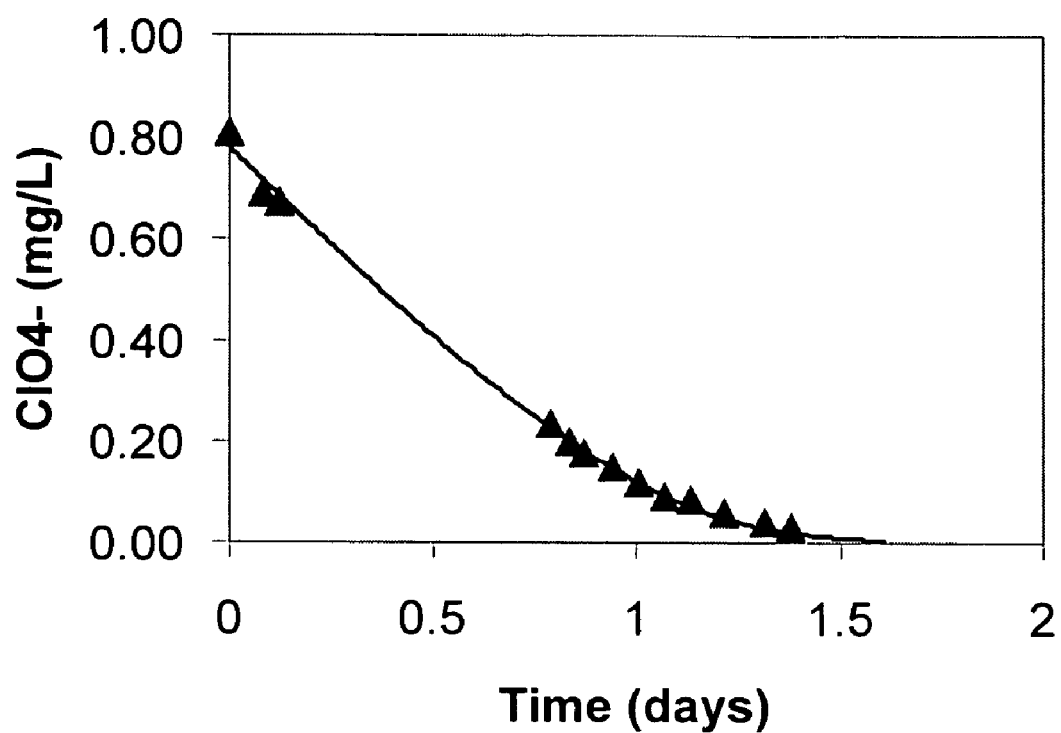

FIG. 6A shows a typical growth curve for perchlorate, and 6B shows a typical K experiment. Similar plots were obtained for nitrate.

As shown in Table 1, the yields for perchlorate were very similar to those for nitrate. This is consistent with the similar Gibb's free energy at pH 7 ($\Delta Go$) for perchlorate and nitrate reduction with hydrogen (118 and 112 kJ/eq e-H2, respectively). The $q_{max}$ for nitrate reduction was around 6 times higher than for perchlorate, on an electron-equivalent (or hydrogen-accepting) basis, demonstrating growth on nitrate much faster that on perchlorate. The K value for perchlorate was 0.15 mg/L, two orders of magnitude lower than values from the literature for other perchlorate-reducing bacteria.

Based on the kinetic parameters, the $S_{min}$ for perchlorate is 40 µg/L. This is an approximate value, since $q_{max}$ does not include competitive inhibition with chlorate. It is unlikely that the actual $S_{min}$ would be much less than this value, suggesting perchlorate can not be reduced to 4 µg/L and/or below levels permissible under regulation with perchlorate as the sole electron acceptor.

TABLE 1

Kinetic parameters for Dechloromonas sp. PC1

| S | $q_{max}$ (eq e⁻H₂/g X-day) | Y (gX/eq e⁻H₂) | K (mg/L) | $S_{min}$ (µg/L) |
|---|---|---|---|---|
| $ClO_4^-$ | 0.25 | 2.88 | 0.15 | 40 |
| $NO_3^-$ | 1.43 | 2.46 | >0.05 | <2 |

Notes:
(1) "eq e⁻H₂" = equivalent of electrons from hydrogen;
(2) 1 eq e⁻H₂/ = 1 g H₂;
(3) b = 0.1 1/day The kinetic parameters for PC1 suggest that perchlorate cannot be reduced below 4 µg/L without another, primary acceptor. Kinetic parameters found for other perchlorate-reducing bacterial suggest the same. See, Logan, B. E., H. S. Zhang, P. Mulvaney, M. G. Milner, I. M. Head and R. F. Unz (2001). Kinetics of perchlorate- and chlorate-respiring bacteria. *Applied and Environmental Microbiology* 67(6): 2499–2506. Other experiments (not shown) demonstrate that nitrate or oxygen can serve as primary acceptors that allow concurrent perchlorate removal. Even if the perchlorate concentration is low compared to nitrate or oxygen, perchlorate helps select for a perchlorate-reducing population. Since most groundwaters and surface waters contain nitrate, oxygen, or both, the MBfR is likely to be effective for a wide range of field applications.

Example 3a

Two bench-scale MBfRs were seeded with a mixed culture from another reactor. The primary acceptor for one reactor was 8-mg/L oxygen, and 5 mgN/L nitrate (plus a minor influent O₂ concentration of about 6 mg/L) for the other. The reactor configurations were in accordance with the schematic illustration of FIG. 7. A minimal medium based on reverse-osmosis water was used. The physical characteristics are summarized in Table 2, below. A high recirculation rate provided completely mixed conditions. After reaching effluent steady state with the primary acceptors, perchlorate was added to the influent: 1,000 µg/L perchlorate for the oxygen reactor, and 100 µg/L for the nitrate reactor.

TABLE 2

Bench-scale reactor characteristics

| PARAMETER | BENCH-SCALE |
|---|---|
| Feed rate | 1 mL/min |
| Recirculation ratio | 150 |
| Detention time | 24 min |
| Number of modules | 1 |
| Module length | 25 cm |
| Module diameter | 0.6 cm |
| Number of fibers per module | 33 |
| Total fiber surface area | 72.3 cm² |

Example 3b

Figure 8A:
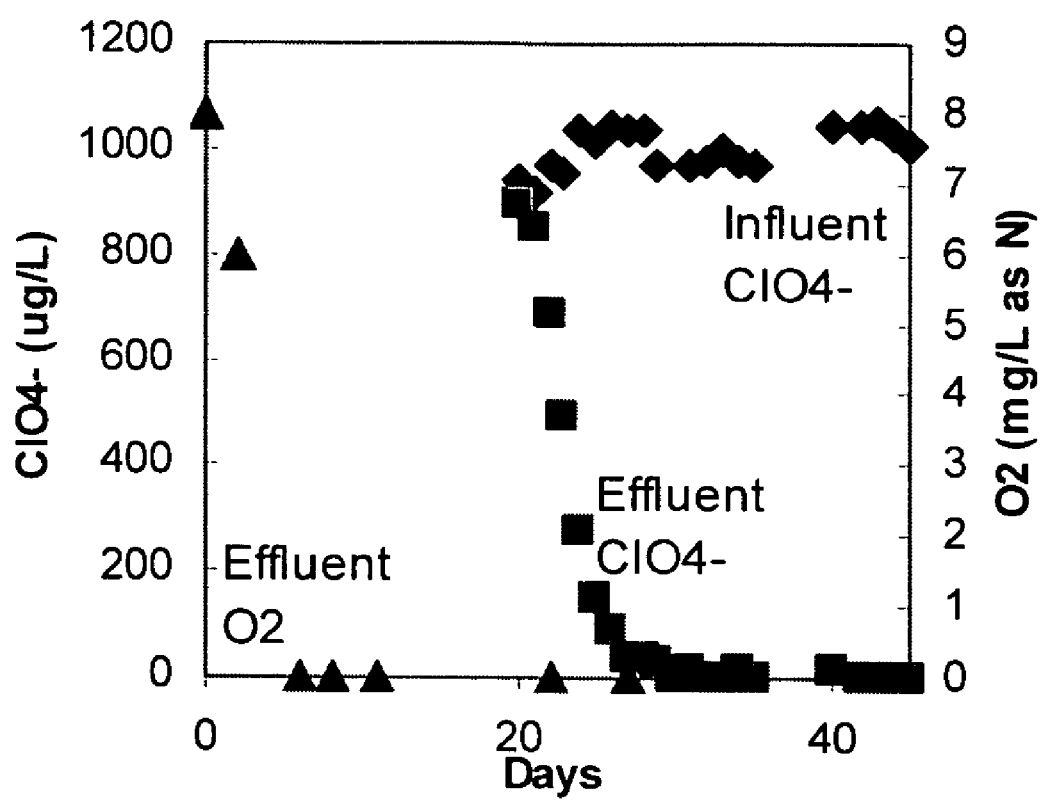
FIG. 8. Perchlorate addition to reactors at steady-state with (A) oxygen, and (B) nitrate. Influent nitrate is 5 mgN/L and influent oxygen is 8 mg/L.
Figure 8B:
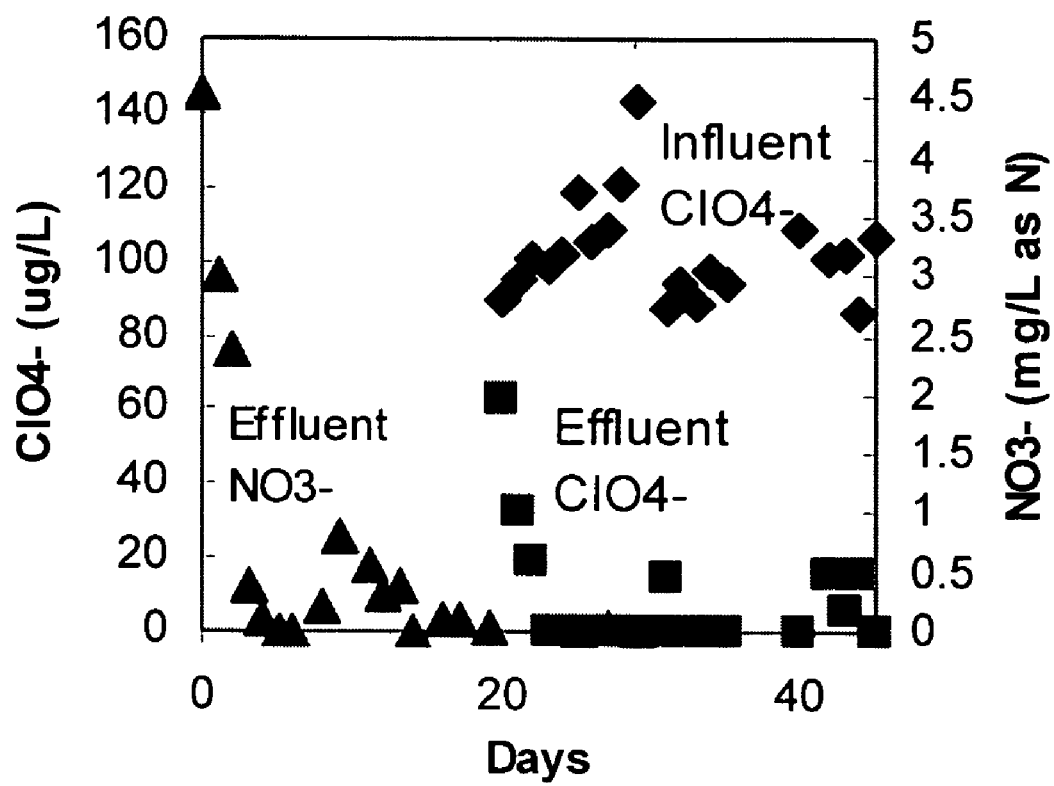

The two bench-scale MBfRs of example 3a were operated for 20 days with 5-mgN/L nitrate or 8-mg/L oxygen in the influent. In the nitrate reactor, the effluent nitrate reached 0.01 mgN/L after around 10 days. In the MBfR with oxygen and no nitrate, the DO levels were below 0.1 mg/L after 4 days of operation. After 20 days, 100-µg/L and 1,000-µg/L perchlorate was added to the nitrate and oxygen reactors, respectively. In the nitrate reactor, the initial removal was 30%, but it increased to more than 90% after 4 days. In the oxygen reactor, the initial removal was 5%, but it increased to more than 99% after 12 days. See, FIGS. 8A–B, below. These results illustrate that even low levels of perchlorate can provide a selective pressure for perchlorate-reducing bacteria, dramatically improving removals. Also, it shows that oxygen can serve as a primary acceptor for perchlorate reduction. Reference is also made to examples 6a–b below.

Example 4

Figure 7:
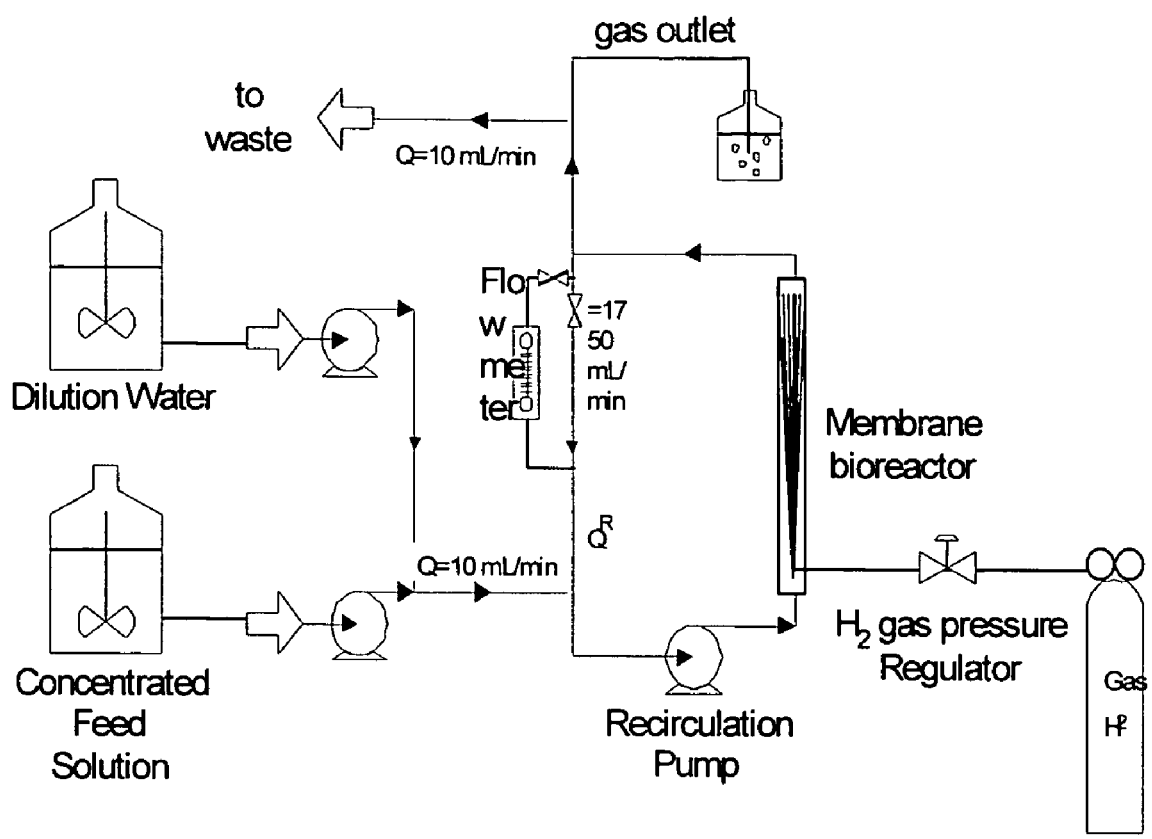
FIG. 7. Schematic of another membrane biofilm reactor, in accordance with an apparatus useful in conjunction with the present invention.

With reference to the fiber configuration of FIG. 2 and the apparatus of FIGS. 1 and 7, hollow fiber membranes can be about 280 µm in diameter with an approximate 40-µm wall, are preferably but not required to be made of two materials: a 1-µm layer of dense polyurethane encased within microporous polyethylene (FIG. 1A). Because the fiber material is hydrophobic, the pores remain dry and do not foul. The dense polyurethane layer prevents bubbling at higher gas pressures, allowing a wide range of gas of pressures that offer a high degree of control over the hydrogen-delivery rate. A scanning electron micrograph (SEM) image of the fiber wall and a confocal laser scanning micrograph (CLSM) image of biofilm on the hollow-fiber membrane are consistent with the preceding and confirm biomass accumulation.

Example 5

A pilot-scale MBfR plant was operated, in accordance with this invention, using a perchlorate-contaminated groundwater at a site owned and operated by La Puente Valley County Water District in Southern California. The reactor and its performance are as discussed in the literature. See, Adham, S., Gillogly, T., Lehman, G., Rittmann, B., Nerenberg, R. (2003). Membrane Biofilm Reactors for Removal of Perchlorate. American Water Works Association ACE. Anaheim, Calif. Nerenberg, R., Rittmann, B., Gillogly, T., Lehman, G., Adham, S. (2003) Perchlorate Reduction Using the Hollow-Fiber Membrane Biofilm Reactor: Bench and Pilot-Scale Studies. Battelle Bioremediation Symposium, Orlando, Fla. Rittman, B., Nerenberg, R., Lee, K.-C., Najm, I., Gillogly, T., Lehman, G., Adham, S. (2002). The Hydrogen-Based Hollow-Fiber Membrane Biofilm Reactor for Removing Oxidized Contaminants. IWA Specialty Conference, Hong Kong.

Example 6a

Some hydrogen-oxidizing, perchlorate-reducing bacteria (PCRB), can denitrify and reduce perchlorate concurrently, with nitrate as a primary acceptor. This example demonstrates various aspects of this invention and explore whether PCRB or non-perchlorate-reducing denitrifiers predominate when an environmental inoculum is used. The microbial ecology of mixed-culture, perchlorate-reducing and denitrifying MBfRs was investigated using activity tests and confirmed using molecular techniques.

Figure 9:
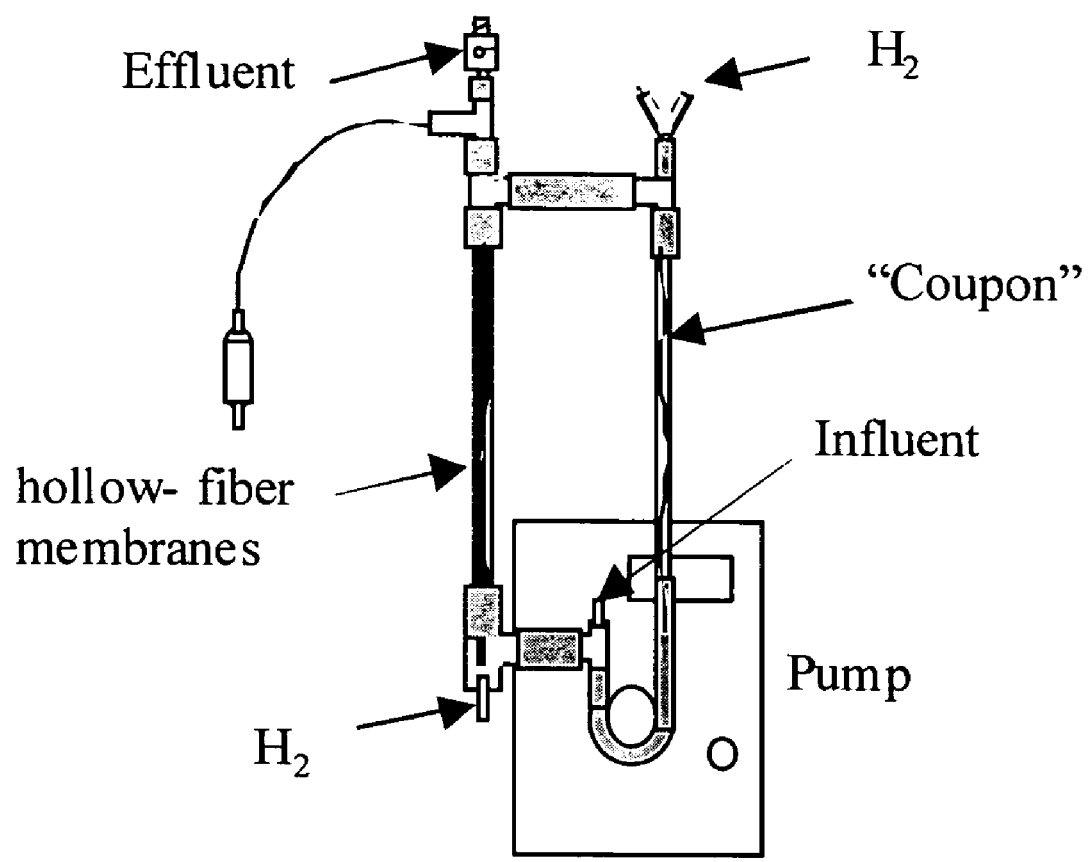
FIG. 9. A schematic of an another membrane biofilm reactor, useful in conjunction with the present methodologies, in accordance with this invention.

A schematic of an MBfR used herewith is shown in FIG. 9. Hydrogen is supplied through a bundle of hollow-fiber-membranes. Water containing a primary acceptor, either nitrate or oxygen, is recirculated past the exterior of the membranes, and a biofilm grows on the membrane surface. Five identical MBfRs were used. Nitrate was the primary acceptor for reactors R1 through R4, and it was oxygen for R5. The detention time was 25 minutes, and the inoculum was a small amount of biofilm from an MBfR treating groundwater with 5 mgN/L nitrate and 60 µg/L perchlorate. After reaching steady state with the primary acceptor, 0, 100, 1,000, and 10,000 µg/L of perchlorate were added to the reactors R1, R2, R3, and R4, respectively. Table 3 shows the experimental conditions.

TABLE 3

| Sample | | $NO_3^-$ conc. (mg/l) | $ClO_4^-$ conc. (mg/l) | $O_2$ conc. (mg/l) |
|---|---|---|---|---|
| R1–4 | (May 21) | 5.0 | — | — |
| R5 | (May 21) | — | — | 8.0 |
| R1 | (June 13) | 5.0 | — | — |
| R2 | (June 13) | 5.0 | 0.1 | — |
| R3 | (June 13) | 5.0 | 1.0 | — |
| R4 | (June 13) | 5.0 | 10.0 | — |
| R5 | (June 13) | — | 1.0 | 8.0 |

Example 6b

Figure 10:
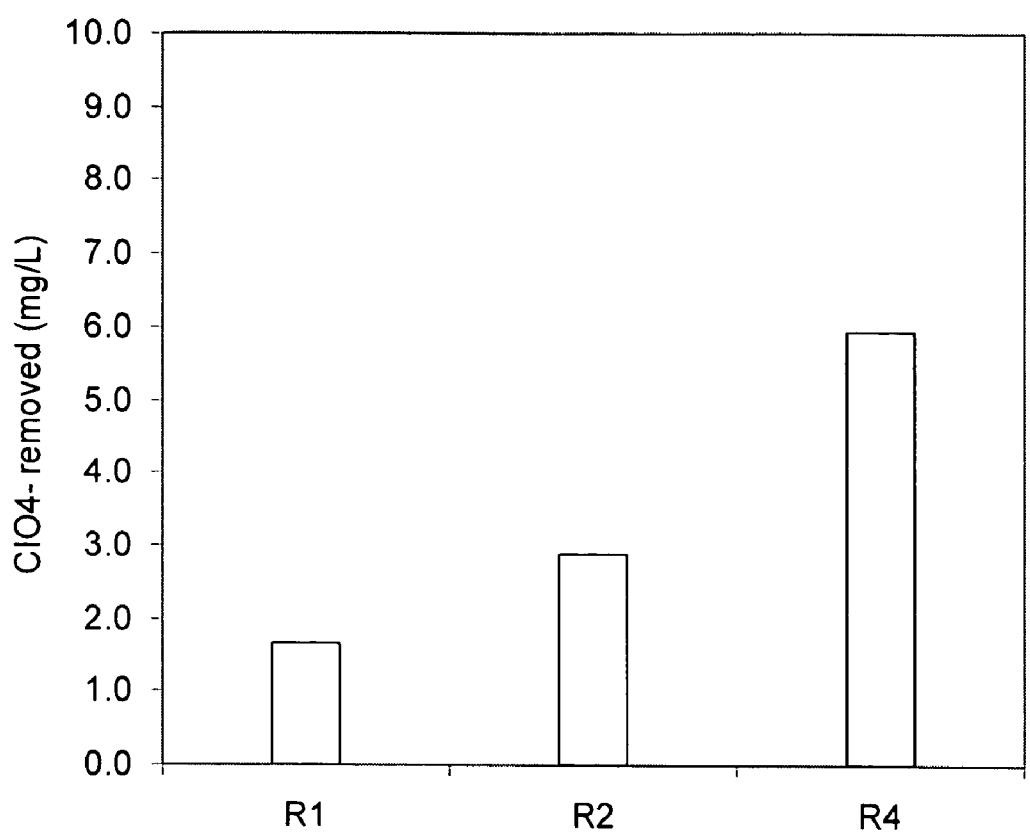
FIG. 10. Graphic representation of average perchlorate removal.

For all reactors, the primary acceptor was completely reduced within 5 days. Perchlorate was reduced completely (R2 and R5) or by about 60% (R3 and R4) within 2 weeks of its addition. Activity tests were carried out to explore the ecology of the MBfRs. Reactors 1, 2, and 4 were challenged with a medium containing 10,000-µg/L perchlorate and 5-mg/L nitrate. The average removals at the end of the tests are plotted in FIG. 10. R3 and R5 were not operating at the time. These results show a higher perchlorate-reducing activity in the reactors that had higher influent perchlorate, suggesting an enrichment for perchlorate-reducing bacteria. Further studies of the microbial community using Denaturing Gradient Gel Electrophoresis (DGGE) suggest an increasing abundance of a perchlorate-reducing isolate for the reactors with increasing influent perchlorate concentrations. Tests using Fluorescent In-Situ Hybridization to quantify bacteria matching the above DGGE band confirm its enrichment with higher influent perchlorate concentrations. More generally, the data of this and the preceding example confirm the results of examples 1c and 3b.

Example 7

A reactor configured according to the schematic of FIG. 9 was tested for removal of several other oxidized drinking water contaminants: chlorate and chlorite. In all tests, the influent included 5-mg/L nitrate or 8 mg/L $O_2$ as a primary electron accepting substrates, plus an oxidized contaminant, i.e., "compound," in Table 4. The reactor was seeded with a mixed culture of autotrophic, denitrifying bacteria from a previous denitrification study, and was operated at a pH of 7 and a 25-minute hydraulic detention time. A high recirculation rate was used to maintain completely mixed conditions. The experiments for all contaminants lasted 10 hydraulic detention times. No attempt was made to optimize contaminant reduction; an objective was simply to demonstrate reduction by a denitrifying or oxygen-reducing mixed culture. The results are summarized in Table 4. In all the tests, over 99 percent of the nitrate and oxygen was reduced.

TABLE 4

| | | Removal Efficiency (%) | |
|---|---|---|---|
| Compound | Probable Reduction Reaction(s) | $O_2$ Reactor | $NO_3^-$ Reactor |
| Arsenate | $H_2AsO_4^- + H_2 + H^+ \rightarrow H_3AsO_3 + H_2O$ | >50 | >50 |
| Bromate | $BrO_3^- + 3H_2 \rightarrow Br^- + 3H_2O$ | >95 | >95 |
| Chlorate | $ClO_3^- + 3H_2 \rightarrow Cl^- + 3H_2O$ | >95 | 29 |
| Chlorite | $ClO_2^- + 2H_2 \rightarrow Cl^- + 2H_2O$ | >75 | 67 |
| Chromate | $HCrO_4^- + 1.5H_2 + 2H^+ \rightarrow Cr(OH)_3 + H_2O$ | >75 | >75 |
| Dichloro-methane | $CH_2Cl_2 + 2H_2 \rightarrow CH_4 + 2H^+ + 2Cl^-$ | 38 | 45 |
| Nitrate | $NO_3^- + 2.5H_2 + H^+ \rightarrow 0.5N_2 + 3H_2O$ | Not tested | >99 |
| Perchlorate | $ClO_4^- + 4H_2 \rightarrow Cl^- + 4H_2O$ | >98 | 36 |
| Selenate | $SeO_4^{2-} + 3H_2 + 2H^+ \rightarrow Se^0 + 4H_2O$ $SeO_4^{2-} + 2H_2 + H^+ \rightarrow HSeO_3^- + H_2O$ | 67 | 74 |
| Selenite | $HSeO_3^- + 2H_2 + H^+ \rightarrow Se^0 + 3H_2O$ | 93 | 57 |

The results show the chlorate and chlorite contaminants are reduced under denitrifying and oxygen reducing conditions—consistent and in accordance with the results obtained with perchlorate. Likewise and without limitation, various other contaminants (e.g., bromate, selenate, selenite, nitrite, etc.) were also reduced and removed, as shown in Table 3. With greater acclimation times, lower input concentrations and/or reactor optimization, higher efficiencies can be obtained.

With reference to the preceding, a range of other oxidized contaminants can be reduced and removed from an aqueous medium, such contaminants including but not limited to oxidized species of uranium, neptunium, sulfur, cadmium, and nickel, as well as other halogenated hydrocarbon compounds. Such contaminants can be treated/removed as would be understood by those skilled in the art made aware of this invention using the procedures described herein for straight-forward modifications thereof, such modifications as would also be known to such individuals without undue experimentation. Likewise, in conjunction with apparatus of the type described herein, such methodologies can be used for selection of bacteria reducing a particular oxidized contaminant, confirmation of which can be confirmed through the techniques described in Example 6b.

We claim:

1. A method for removing a perchlorate component from an aqueous system, said method comprising:

providing an aqueous system comprising hydrogen-oxidizing bacteria, a primary electron acceptor component, and a perchlorate component, said primary electron acceptor component supporting accumulation of said bacteria;

contacting said system with gaseous hydrogen; and reducing said perchlorate component.

2. The method of claim 1 wherein said primary electron acceptor component is selected from oxygen and a nitrate anion.

3. The method of claim 2 wherein said primary electron acceptor component is introduced to said system prior to introduction of said perchlorate component.

4. The method of claim 2 wherein said primary electron acceptor component is introduced to said system concurrent with introduction of said perchlorate component.

5. The method of claim 2 wherein said primary electron acceptor component has a system concentration sufficient for supporting steady-state accumulation of bacteria.

6. The method of claim 5 wherein said primary electron acceptor component is influent to said system.

7. The method of claim 6 wherein said perchlorate component is influent to said system.

8. The method of claim 7 wherein said perchlorate component has an influent concentration of greater than about 100 µg/L.

9. The method of claim 7 wherein said perchlorate component has an effluent concentration less than about 4 µg/L.

10. A method of using a primary electron acceptor to remove an oxidized contaminant from an aqueous system, said method comprising:

providing an aqueous system comprising hydrogen-oxidizing bacteria;

introducing a primary electron acceptor component to said system;

introducing an oxidized contaminant to said system; and contacting said system with gaseous hydrogen.

11. The method of claim 10 wherein said primary electron acceptor component is selected from oxygen and nitrate anion.

12. The method of claim 11 wherein said primary electron acceptor component has a concentration sufficient for supporting steady-state accumulation of bacteria.

13. The method of claim 11 wherein said primary electron acceptor component is removed upon continued introduction of said oxidized contaminant.

14. The method of claim 10 wherein said oxidized contaminant is selected from perchlorate, chlorate, chlorite and a combination thereof.

15. The method of claim 14 wherein removal of said oxidized contaminant is enhanced upon continued introduction of said oxidized contaminant.

16. The method of claim 10 wherein said primary electron acceptor component and said oxidized contaminant are influent to said system.

17. The method of claim 16 wherein said system is adjunct to another system for contaminant removal.

18. The method of claim 10 wherein said oxidized contaminant is selected from arsenate, bromate, chromate, dichloromethane, nitrate, nitrite, selenate, selenite and combinations thereof.

19. The method of claim 10 wherein said oxidized contaminant is selected from oxidized species of uranium, neptunium, sulfur, cadmium, nickel and combinations thereof.

20. The method of claim 10 wherein said oxidized contaminant is a halogenated hydrocarbon.

21. A method of using a water treatment apparatus for selection of bacteria reducing an oxidized contaminant, said method comprising:

providing a system comprising hydrogen-oxidizing bacteria and an apparatus comprising at least one hollow fiber membrane, each said hollow fiber member in fluid communication with a hydrogen source;

introducing a primary electron acceptor component to said system;

introducing an oxidized contaminant to said system; and contacting said system with gaseous hydrogen, said bacteria oxidizing said hydrogen, and said system selective for bacteria reducing said oxidized contaminant.

22. The method of claim 21 wherein each said membrane comprises inner and outer layers having a first density and a layer therebetween having a second density greater than said first density.

23. The method of claim 22 wherein said layer between said inner and outer layers is substantially non-porous.

24. The method of claim 21 wherein said primary electron acceptor component is selected from oxygen and nitrate anion.

25. The method of claim 24 wherein said primary electron acceptor component is nitrate anion.

26. The method of claim 25 wherein said nitrate anion has a concentration sufficient for supporting steady-state accumulation of bacteria.

27. The method of claim 26 wherein said oxidized contaminant is selected from perchlorate, chlorate, chlorite and a combination thereof.

28. The method of claim 27 wherein said oxidized contaminant is perchlorate.

29. The method of claim 28 wherein said system is selective for bacteria reducing perchlorate.

30. The method of claim 29 wherein said perchlorate contaminant has a system concentration insufficient for supporting steady-state accumulation of bacteria.

31. The method of claim 24 wherein said primary electron acceptor component is oxygen.

32. The method of claim 31 wherein said oxygen has a concentration sufficient for supporting steady-state accumulation of bacteria.

33. The method of claim 32 wherein said oxidized contaminant is selected from perchlorate, chlorate, chlorite and a combination thereof.

34. The method of claim 33 wherein said oxidized contaminant is perchlorate.

35. The method of claim 34 wherein said system is selective for bacteria reducing perchlorate.

36. The method of claim 35 wherein said perchlorate contaminant has a system concentration insufficient for supporting steady-state accumulation of bacteria.

37. The method of claim 21 wherein said oxidized contaminant is selected from arsenate, bromate, chromate, dichloromethane, nitrate, nitrite, selenate, selenite and combinations thereof.

38. The method of claim 37 wherein said system is selective for bacteria reducing at least one of said contaminants.

39. The method of claim 21 wherein said oxidized contaminant is selected from an oxidized species of uranium, neptunium, sulfur, cadmium, nickel and combinations thereof.

40. The method of claim 39 wherein said system is selective for bacterial reducing at least one of said contaminants.

41. The method of claim 21 wherein said oxidized contaminant is a halogenated hydrocarbon.

42. The method of claim 41 wherein said system is selective for bacteria reducing a halogenated hydrocarbon.

* * * * *